United States Patent [19]

Bixby

[11] 4,184,950

[45] Jan. 22, 1980

[54] METHOD AND APPARATUS FOR DEWATERING SLUDGE

[75] Inventor: Leon C. Bixby, Owensboro, Ky.

[73] Assignee: Hendrick Manufacturing Company, Carbondale, Pa.

[21] Appl. No.: 879,047

[22] Filed: Feb. 21, 1978

Related U.S. Application Data

[63] Continuation of Ser. No. 770,367, Feb. 22, 1977, abandoned, and a continuation of Ser. No. 598,571, Jul. 24, 1975, abandoned.

[51] Int. Cl.² .................................................. B01D 37/04
[52] U.S. Cl. .................................. 210/73 R; 210/533
[58] Field of Search ............. 210/65, 67, 73 R, 73 S, 210/83, 120, 163-165, 498, 499, 532 R, 532 S, 533-535; 209/243, 244, 393, 394, 409, 412

[56] References Cited

U.S. PATENT DOCUMENTS

| 596,540 | 1/1898 | Potter | 210/498 |
|---|---|---|---|
| 1,537,818 | 5/1925 | Griffith | 210/316 |
| 1,623,728 | 4/1927 | Hooton | 210/534 |
| 1,939,636 | 12/1933 | Weber | 210/67 |
| 1,940,952 | 12/1933 | Hutchens | 210/498 X |
| 2,072,415 | 3/1937 | Abbitt | 210/499 X |
| 2,182,795 | 12/1939 | Day | 210/164 |
| 2,233,641 | 3/1941 | Ramsey | 210/67 X |
| 2,259,688 | 10/1941 | Genter | 210/2 |
| 2,491,912 | 12/1949 | Walker | 209/393 X |
| 2,690,265 | 9/1954 | Bixby | 210/499 X |
| 2,928,548 | 3/1960 | Knapp et al. | 210/525 |
| 3,037,630 | 6/1962 | Bixby | 209/393 |
| 3,216,569 | 11/1965 | Crundall | 210/73 |
| 3,451,555 | 6/1969 | Ginaven | 210/499 X |
| 3,483,974 | 12/1969 | Pearsall | 209/395 X |
| 3,662,896 | 5/1972 | Pink et al. | 210/525 |

FOREIGN PATENT DOCUMENTS

| 1288399 | 2/1962 | France | 209/395 |
|---|---|---|---|
| 1313131 | 11/1962 | France | 210/65 |

Primary Examiner—William A. Cuchlinski, Jr.

[57] ABSTRACT

Sludge to be dewatered is deposited on drainage slabs which slope toward a trough to which water draining from the deposited sludge is permitted to flow. Supported at the open top of the trough is a perforate member, and the trough is initially filled with a support water immersing the perforate member, the support water allowing sludge to flow over the perforate member, but minimizing the tendency of such sludge to settle through the perforate member. In the practice of the process disclosed, the support water is permitted to drain from its trough at approximately the rate new water drains to the trough from the deposited sludge.

2 Claims, 5 Drawing Figures

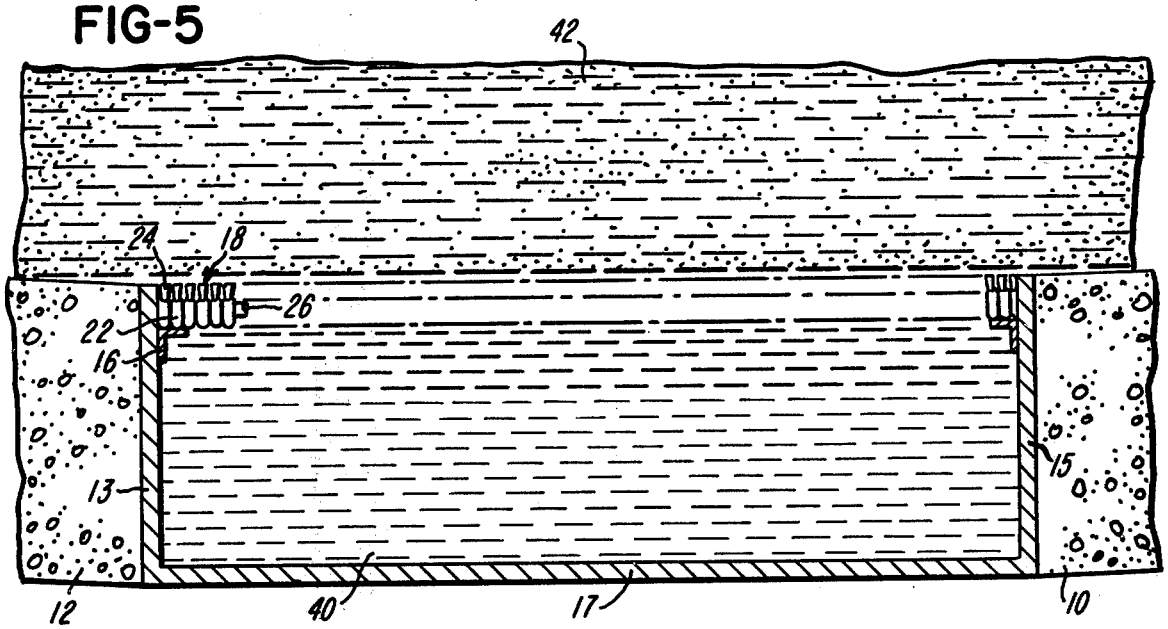
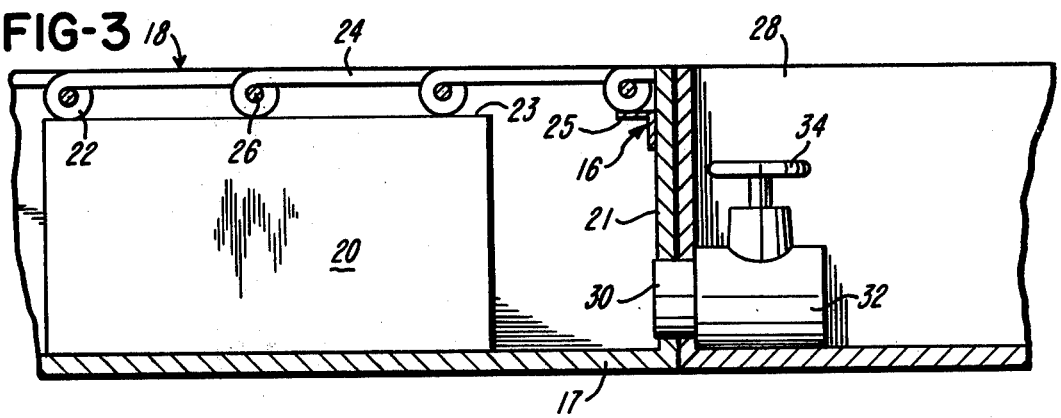

METHOD AND APPARATUS FOR DEWATERING SLUDGE

This is a continuation, of application Ser. No. 770,367 filed Feb. 22, 1977 now abandoned, for METHOD AND APPARATUS FOR DEWATERING SLUDGE and in turn a continuation of application Ser. No. 598,571, filed July 24, 1975 for METHOD AND APPARATUS FOR DEWATERING SLUDGE now abandoned.

BACKGROUND OF THE INVENTION

1. Field of the Invention

This invention relates to a method and apparatus for dewatering sludges and slurries, such as sewage sludges and paper mill slurries.

2. Prior Art

It is known to dewater sludges by placing the sludge on perforate plates or screens which may be inclined and which are supported above drainage plates, which may also be inclined. Examples of such dewatering apparatus appear in U.S. Pat. Nos. 1,537,818 and 596,540. It has also been observed that sludge can be dewatered and sun-dried by merely spreading the sludge upon a sloped slab such as a concrete slab. Thus, it has been known to separate two such slabs, which are sloped oppositely to form a trough, by a sand filter to which the water drained from the sludge is permitted to flow. Other and different types of techniques for dewatering sludge and the like appear in the following U.S. Pat. Nos.: 1,673,728, 2,259,688, 2,928,548, 1,940,952, 2,491,912, 3,662,896.

British Pat. No. 21,355 illustrates a dewatering technique applied to the withdrawal of wort from a mash tun.

U.S. Pat. No. 3,216,569 illustrates a sludge dewatering apparatus which has received attention recently in a number of U.S. sewage plants. In the technique described in this last named patent, sewage sludge is deposited onto a perforate screen or plate which is immersed into water, characterized as support water, such water supported in a chamber located below the perforate plate. After the sludge has been accumulated above the perforate plate to a desired depth, the support water located in the chamber underlying the perforate plate is slowly removed at a controlled rate. The slow water removal avoids a discharge of the sludge being dewatered through the perforations in the perforate plate. Consequently, a large fraction of the water normally present in the sludge is withdrawn from the sludge through the perforate plate with a minimum of escape of sludge. The sludge lying immediately upon the perforate member thus functions as a filter, which minimizes a downflow of sludge through the perforate member.

SUMMARY OF THE INVENTION

While the dewatering method disclosed in U.S. Pat. No. 3,216,569 is encountering an increasing acceptance in small sewage installations, particularly those serving populations not exceeding 5,000 to 6,000 people, and in some cases installations serving industries whose sludge dewatering demands are not excessive, the technique disclosed in U.S. Pat. No. 3,216,569 has not been applied to larger sewage facilities due to the expense in producing and maintaining the perforate plate means upon which the sludge is deposited and, more importantly, the expenses involved in removing the dewatered sludge from the perforate member upon which the sludge rests. Thus when the daily sludge accumulation is small and can be removed manually with simple devices such as shovels, the process of U.S. Pat. No. 3,216,569 is applicable. For serving larger population centers wherein sludge removal requires mechanized equipment which is easily damaging to the perforate member upon which the sludge rests, it has heretofore been more feasible to utilize other sludge dewatering means such as vacuum dewatering plants and/or microstrainers, which are found more economical to operate in the service of large population centers.

The present invention bridges the gap between the process of U.S. Pat. No. 3,216,569, which can serve only small population centers, and the vacuum dewatering and like processes, which are economically feasible only when serving very large population centers, by dramatically increasing the amounts of sludge that can be processed in accordance with the dewatering technique as described in U.S. Pat. No. 3,216,569.

In the present invention, an elongate water trough is constructed between elongate concrete slabs which flank the water trough and which slope downwardly toward the water trough. The trough is covered with a perforate means adequately supported to permit vehicles to travel thereover. In operation, a support water charged to the trough overflows the trough to submerge the perforate means. Sludge is then distributed upon the concrete slabs and flows downwardly onto the perforate means. The support water is then slowly withdrawn so as to permit water draining down the concrete surfaces toward the water trough to replace the support water being slowly withdrawn.

BRIEF DESCRIPTION OF THE DRAWINGS

In the drawings:

FIG. 3 is a fragmentary section view taken substantially along the line 3—3 of FIG. 2.

FIG. 5 is a section view taken substantially along the line 5—5 of FIG. 4.

DESCRIPTION OF THE PREFERRED EMBODIMENT

Figure 1:
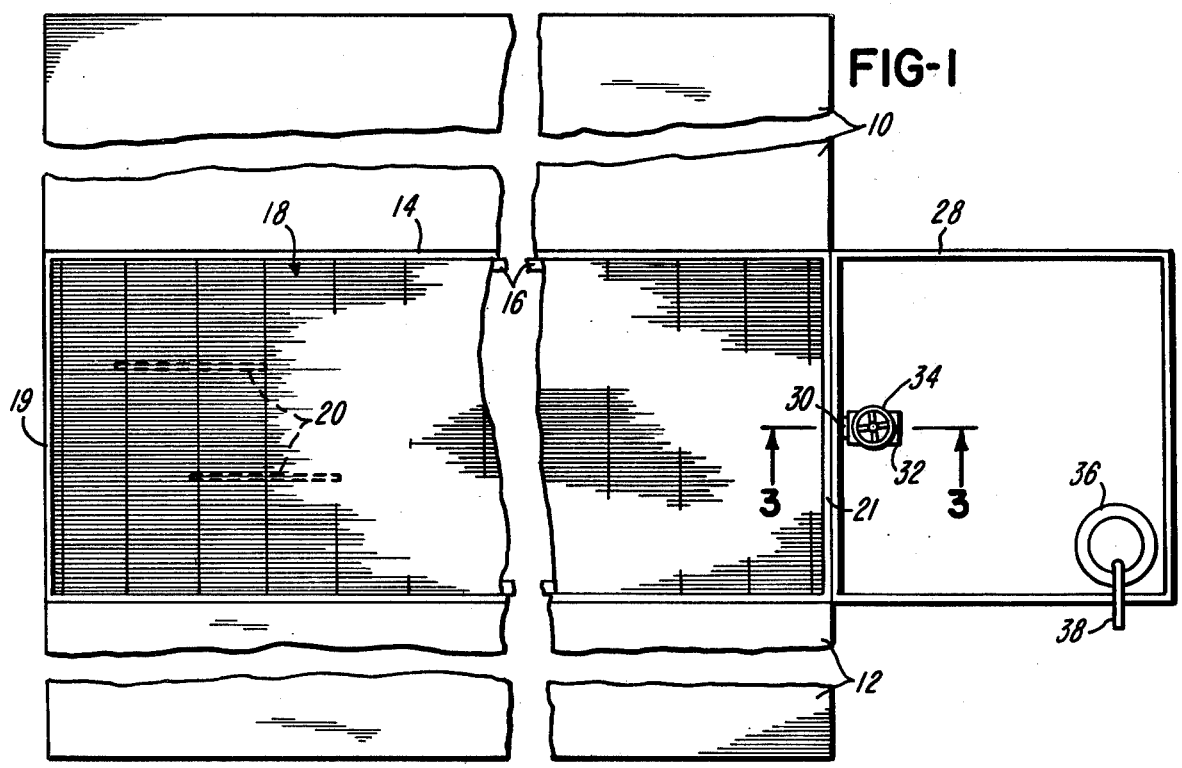
FIG. 1 is a fragmentary plan view of an apparatus constructed in accordance with the present invention, portions of the apparatus having been broken away to reduce the size of the figure.

FIG. 1 schematically illustrates two elongate slabs 10 and 12, which may be concrete slabs. The slabs 10 and 12 extend parallel to one another on the opposite sides of a trough 14, which is preferably of sheet metal construction. As appears in FIG. 5, the trough has generally vertical side walls 13 and 15 and a base 17. Also as appears in FIG. 1, the trough has end walls 19 and 21.

Figure 2:
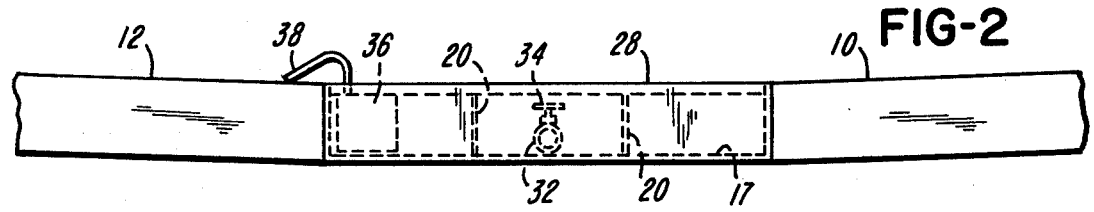
FIG. 2 is a fragmentary end elevation view of the apparatus in FIG. 1.

As appears in FIG. 2, the slabs 10 and 12 slope upwardly from the opposite sides of the trough 14. Staggered along the length of the trough 14 are two rows of vertically disposed support plates 20, which are a structural steel affixed to the base 17 as by welding, not shown. Also extending lengthwise of each of the side walls 13 and 15 are angle bars 16, which are welded or otherwise affixed to the side walls 13 and 15.

A wedgewire screen 18 which comprises parallel wire elements, each having loops 22 encircling support rods 26 at spaced intervals along the length of the wires, rests upon the angle bars 16 and upon the staggered support plates 20. As appears in FIG. 3, the top surfaces 23 of the support plates 20 and the horizontal flanges 25 of the angle bars 16 are generally coplanar so as to support the screen 18 in a generally horizontal position. As appears in FIG. 5, the top surface of the screen is generally coplanar with the top edges of the sides 13 and 15 of the trough 14. Also as appears in FIG. 5, the concrete slabs 10 and 12 have upper surfaces which are generally flush with the upper edges of the walls 13 and 15.

Affixed to one end of the trough 14, as by welding not shown, is an effluent box 28. The abutting wall surfaces of the trough 14 and the effluent box have aligned apertures therein which receive a pipe 30. Connected to the pipe 30 within the effluent box 28 is a flow control valve 32 subject to the regulation of a control member 34.

Also located in the effluent box is a sump pump 36 to which is connected a discharge tube 38. It is contemplated in the practice of the present invention that the discharge tube 38 will be connected by means, not shown, to return water removed from the effluent box 28 to a sewage works being served by the apparatus herein disclosed.

In a preferred embodiment, the concrete slabs 10 and 12 are each twenty-four feet (7.32 meters) wide and one hundred thirty feet (39.62 meters) long. The upper surfaces of such slabs each slope downwardly toward the trough 14 at an approximately two degree angle. Preferably, the trough 14 and also the slabs 10 and 12 slope downwardly, an inch or two over their entire length, toward the effluent box 28 so that any water run-off will be toward the effluent box.

The trough 14 is constructed from one-quarter inch (0.635 centimeter) carbon steel, the trough being two feet (0.61 meter) wide and one hundred thirty feet (39.62 meters) long (outer dimensions). The trough 14 is also four inches (10.16 centimeters) deep (outer dimension), and the horizontal surfaces 25 of the angle bars 16 are located approximately three-quarters of an inch (1.91 centimeters) below the upper edges of the side walls 13 and 15. The support plates 20 are each approximately one foot (0.3048 meter) long, one-quarter inch (0.635 centimeter) thick and extend upwardly approximately three and one-quarter inches (8.26 centimeters) to engage the undersides of the loops 22. The support plates are arranged in two parallel rows, one spaced about eight inches (20.32 centimeter) from one side wall of the trough 14, and the other spaced about eight inches (20.32 centimeters) from the opposite side wall for the trough 14. The support plates in one of such rows are staggered with respect to the support plates in the other of such rows; and the support plates in each row are spaced approximately one foot (0.3048 meter) apart. The effluent box 28 is approximately two feet (0.61 meter) square (outside dimension), and the valve 32 is a two-inch (5.08-centimeters) gate valve.

In the operation of such a unit, the trough 14 is filled to overflowing with water from a suitable hose, not shown, so as to submerge the screen 18. Accordingly, the edges of the slabs 10 and 12 adjacent the trough 14 may be also partially submerged with water. At this filling time, the valve 32 is closed.

The slabs 10 and 12 are of an adequate width and are preferably adequately reinforced to permit small dump trucks or the like, not shown, to travel along the length thereof. The dump trucks are operated to deposit on the slabs 10 and 12 a layer of sludge which is approximately six to eight inches (15.24 to 20.32 centimeters) deep. While the dump trucks are operated so as not to deposit sludge directly onto the screen 18, the downward slope of the slabs 10 and 12 toward the screen 18 will cause sludge to flow onto the screen 18, producing a sludge layer over the screen which is supported by underlying water 40 as schematically illustrated in FIG. 5. Due to the presence of the support water in the trough 14, there will be only a nominal tendency of the sludge to settle through the screen 18.

Figure 4:
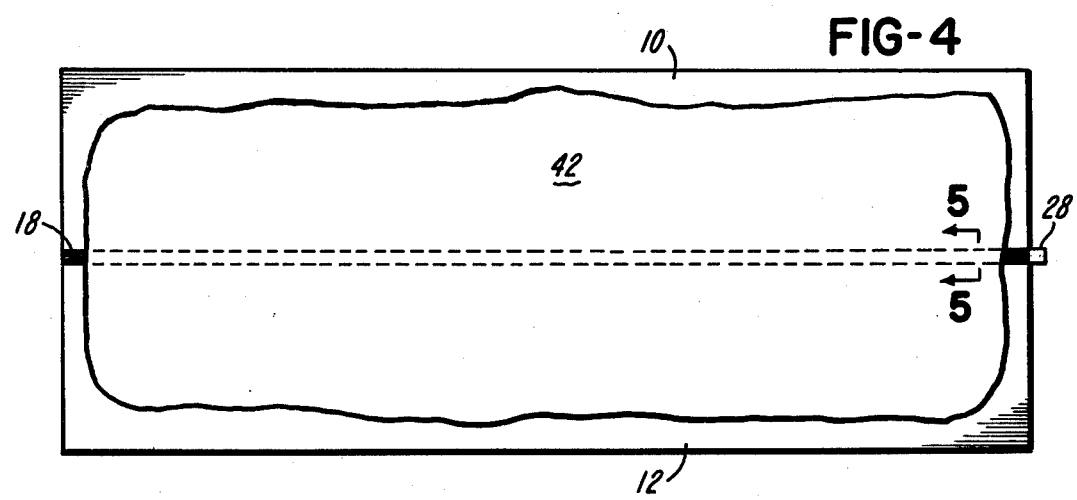
FIG. 4 is a plan view illustrating a deposit of sludge on the apparatus of the present invention.

As shown in FIG. 4, the resulting sludge layer 42 which has been spread over the slabs 10 and 12 is spaced inwardly from the edges of the slabs to minimize a run-off of water, particularly at the ends of the slabs.

After deposition of the sludge onto the slabs 10 and 12, the valve 32 is opened slowly to permit a controllably slow discharge of water from the trough 14 to the effluent box 28. As water enters the effluent box, the sump pump 36 is energized to pump the water accumulating in the effluent box to whatever works is being served.

In this phase of operation, it is important that the discharge of water from the trough 14 does not exceed the rate at which water drains from the sludge toward the trough 14. Thus it is not desired at this stage of operation that the level of support water remaining in the trough 14 can drop below the level of the screen 18. With experience, a proper setting for the valve 32 can be determined which will enable the selection of a proper diameter for the pipe 30 and the use of a simple on-off mechanism which permits the pipe 30 to be either entirely open or entirely closed.

Over a period of time, such as twelve to twenty-four hours, all of the water capable of freely draining from the sludge will have left the sludge and entered the trough 14. The consistency of the sludge is then sufficiently pastey and self-supporting that the sludge will not collapse through the screen 18 and all support water can be permitted to drain from the trough 14.

The sludge can now be immediately removed or alternatively permitted to further dewater by evaporation through the action of the air and sunlight. The dewatered sludge is conveniently removed with the aid of front end loader trucks, not shown, which are used to scrape the sludge off the slabs 10 and 12. Preferably, after the slabs 10 and 12 have been scraped free of sludge, plastic blades are attached to the scrapers, not shown, to protect the screen 18, and the sludge remaining on the screen is scraped off the screen.

The screen 18 and the slabs 10 and 12 are then thoroughly hosed down, and any further sludge thereby removed from the surfaces being hosed is washed through the trough 14 and the pipe 30 to the effluent box 28, where such remaining sludge can be collected and returned to the works being served.

While the preferred embodiment is described as covered with a sludge layer six to eight inches (15.24 to 20.32 centimeters) thick, it is to be understood that such thickness is variable over a wide range, depending upon the nature of the sludge being processed and the daily processing demands placed upon the dewatering system. Those skilled in the art will appreciate, however, that it is desirable to minimize as much as possible the thickness of the deposited sludge since, as the thickness increases, the overlying sludge tends to compact the underlying sludge with the result that water from the upper layers drains less freely through the lower layers of sludge.

One of the particular advantages of the present invention is that a large volume of sludge is processed over a large area with the result that the compaction of underlying sludge by overlying sludge can be minimized.

Other advantages residing in the dewatering equipment disclosed in the present application are that the screen 18 is easily washed and is reusable an indefinite number of times. Further, there is no carry-over of sludge from one use of the equipment to the next, such as inevitably occurs in the use of sand filters, which in time become clogged or blinded with sludge retained in the sand from prior uses and thus require backwashing or the like.

Although the preferred embodiment of this invention has been described, it will be understood that various changes may be made within the scope of the appended claims.

Having thus described my invention, I claim:

1. In a sludge dewatering apparatus of the type wherein first sludge forming a layer overlying a support liquid immersing a support screen is dewatered by withdrawing support liquid from below said screen for replacement by liquid draining from said first sludge, the improvement including at least one drainage slab sloped upwardly and extending outwardly from one side of said screen for supporting a layer of second sludge alongside said first sludge and for directing liquid draining to said slab from said layer of second sludge to said support liquid for futher replacement of support liquid withdrawn from below said screen, while continuing to support the second sludge from which such liquid drains.

2. The method of dewatering sludge which comprises filing a trough with support water to immerse a screen disposed across an opening to said trough, depositing sludge onto said support water and onto a drainage slab inclined upwardly from a side of said trough, allowing water to drain to said trough from the sludge residing on said support water and on said drainage slab, and discharging water from said trough at an initial rate not exceeding the rate at which water drains from said sludge to said trough.

* * * * *

UNITED STATES PATENT AND TRADEMARK OFFICE
CERTIFICATE OF CORRECTION

PATENT NO. : 4,184,950
DATED : January 22, 1980
INVENTOR(S) : Leon C. Bixby

It is certified that error appears in the above–identified patent and that said Letters Patent are hereby corrected as shown below:

Column 1, line 32, Patent No. "1,673,728" should be ---1,623,728---

Column 3, line 52, "for" should be ---of---

Claim 2, line 2, "filing" should be ---filling---

Signed and Sealed this

Third Day of June 1980

[SEAL]

Attest:

SIDNEY A. DIAMOND

Attesting Officer    Commissioner of Patents and Trademarks